US012623891B2

(12) United States Patent
Page

(10) Patent No.: US 12,623,891 B2
(45) Date of Patent: May 12, 2026

(54) APPARATUS FOR SPREADING OPPOSING SURFACES

(71) Applicant: Stuart Hazen Page, Indian Trail, NC (US)

(72) Inventor: Stuart Hazen Page, Indian Trail, NC (US)

( * ) Notice: Subject to any disclaimer, the term of this patent is extended or adjusted under 35 U.S.C. 154(b) by 223 days.

(21) Appl. No.: 17/820,083

(22) Filed: Aug. 16, 2022

(65) Prior Publication Data

US 2023/0046292 A1 Feb. 16, 2023

Related U.S. Application Data

(60) Provisional application No. 63/233,469, filed on Aug. 16, 2021.

(51) Int. Cl.

| | |
|---|---|
| ***B66F 3/30*** | (2006.01) |
| ***A62B 3/00*** | (2006.01) |
| ***B66F 3/24*** | (2006.01) |
| ***B66F 3/28*** | (2006.01) |
| ***B66F 3/36*** | (2006.01) |
| ***E04G 25/04*** | (2006.01) |

(52) U.S. Cl.

CPC ................ *B66F 3/30* (2013.01); *B66F 3/247* (2013.01); *B66F 3/28* (2013.01); *B66F 3/36* (2013.01); *E04G 25/04* (2013.01); *A62B 3/005* (2013.01); *Y10T 29/53683* (2015.01)

(58) Field of Classification Search

CPC ...... B66F 3/30; B66F 3/36; B66F 3/28; B66F 3/247; A62B 3/005; Y10T 29/53683; E04G 25/04

USPC ..................... 254/93 R, 134, 133 R; 29/239; 248/354.1

See application file for complete search history.

(56) References Cited

U.S. PATENT DOCUMENTS

| | | | | |
|---|---|---|---|---|
| 1,723,970 A | | 8/1929 | Jauch | |
| 2,316,432 A | | 4/1943 | Von K. Hott | |
| 2,617,620 A | | 11/1952 | Jessop | |
| 2,717,145 A | | 9/1955 | Andrew | |
| 2,777,660 A | | 1/1957 | Albrecht | |
| 2,914,813 A | | 12/1959 | Christian et al. | |
| 3,210,047 A | | 10/1965 | Jackson | |
| 3,851,868 A | | 12/1974 | Lagasse | |
| 4,221,362 A | | 9/1980 | Van Santen | |
| 4,762,304 A | * | 8/1988 | Hill ........................ | A62B 3/005 72/705 |
| 4,783,053 A | * | 11/1988 | Yirmiyahu ............. | B25B 28/00 72/705 |
| 4,890,818 A | | 1/1990 | Williams | |
| 5,340,095 A | | 8/1994 | Eicher, III | |

(Continued)

OTHER PUBLICATIONS

NPL1, doorjack.com, available Dec. 26, 2021 (Year: 2021).*

(Continued)

*Primary Examiner* — Michael A Gump

(74) *Attorney, Agent, or Firm* — Dunlap Bennett & Ludwig PLLC

(57) ABSTRACT

The present invention relates to a mechanically advantaged system that is purposed to spread opposing surfaces with user input. This apparatus needs only one operator. This apparatus can be used to move or spread material or equipment over a long-range, by extending the base unit 2 inches at a time, or by adding multiple extension tubes of 1 foot, 2 foot, 4 foot, or custom length extensions.

9 Claims, 5 Drawing Sheets

(56) References Cited

U.S. PATENT DOCUMENTS

| | | | | | |
|---|---|---|---|---|---|
| 5,971,362 | A | | 10/1999 | Clark | |
| 6,027,102 | A | * | 2/2000 | Krupa | B66F 13/00 254/134 |
| 6,152,424 | A | | 11/2000 | Lapat | |
| 6,158,705 | A | * | 12/2000 | Cudmore | A62B 3/005 248/354.1 |
| 6,736,371 | B1 | * | 5/2004 | Burrows | B60P 7/15 254/114 |
| 6,746,183 | B1 | * | 6/2004 | Sullivan | E04G 25/068 405/278 |
| 6,976,339 | B1 | | 12/2005 | Riccio et al. | |
| 7,490,813 | B1 | * | 2/2009 | Weddle | B66F 3/24 248/354.1 |
| 8,162,289 | B2 | | 4/2012 | McCaleb | |
| 8,899,553 | B2 | * | 12/2014 | Hickerson | A62B 3/005 254/133 R |
| 10,125,608 | B2 | * | 11/2018 | Moye | E04G 23/04 |
| 10,413,759 | B2 | | 9/2019 | Hickerson | |
| 2005/0161571 | A1 | * | 7/2005 | Wood | E04G 25/06 248/354.3 |
| 2019/0292029 | A1 | * | 9/2019 | Moore | B66F 3/42 |

OTHER PUBLICATIONS

Weddle tool company—door spreader, battering ram, forcible entry tool—door spreader, battering ram, forcible entry tool. Weddle Tool Company Door Spreader Battering Ram Forcible Entry Tool. (n.d.). Retrieved Aug. 11, 2022, from https://weddletoolco.com/.

* cited by examiner

APPARATUS FOR SPREADING OPPOSING SURFACES

CROSS-REFERENCE TO RELATED APPLICATION

This application claims the benefit of priority of U.S. provisional application No. 63/233,469 filed Aug. 16, 2021, the contents of which are herein incorporated by reference.

BACKGROUND OF THE INVENTION

The present invention relates to mechanical devices and, more particularly, to a mechanically advantaged system purposed to spread opposing surfaces with user input.

There is currently not a good portable, hand-carry device for spreading or moving materials or equipment that requires an extendable means of adding leverage. Traditional jacking devices are limited to the operational length of the jack ram and cylinder and typically require a separate hydraulic pump with a hydraulic hose. Other devices are made of heavier steel, most requiring multiple users or lifting equipment to use, not strong lightweight aluminum tubes, other devices have a limited range of usable motion, and do not have extensions to allow use over longer spaces.

As can be seen, there is a need for an apparatus as detailed herein. The apparatus of the present invention needs only one operator to carry and operate. This apparatus can be used to move or spread material or equipment over a long-range, by extending the base unit two inches at a time, or by adding multiple extension tubes of 1 foot, 2 foot, 4 foot, or custom length extensions.

SUMMARY OF THE INVENTION

In one aspect of the present invention, an apparatus for spreading objects is disclosed, with the apparatus comprising: a first elongated tube and a second elongated tube telescopically and slidably coupled to one another; a hydraulic jack coupled to a distal end of the first elongated tube; a jack shaft coupled to the hydraulic shaft; a first shoe coupled to a distal end of the jack shaft; and a second shoe coupled to a distal end of the second elongated tube, wherein the jack shaft is configured to selectively increase a first spacing that is defined between the first shoe and the second shoe.

In certain embodiments, the jack shaft is configured to selective increase a second spacing that is defined between the first tube and the first shoe.

In certain embodiments, the apparatus further comprises a pin configured to lock the first elongated tube and the second elongated tube in position relative to one another.

In certain embodiments, the first elongated tube defines a plurality of first openings and the second elongated tube defines a plurality of second openings, the plurality of first openings and the plurality of second openings being configured to receive the pin.

In certain embodiments, a third spacing, which is defined between the first shoe and the second shoe, is adjustable between approximately 32 inches to 48 inches.

In certain embodiments, the second shoe is detachably coupled to the distal end of the second elongated tube.

In certain embodiments, the apparatus further comprises an extension tube configured to couple the distal end of the second elongated tube and to the second shoe.

In certain embodiments, the first shoe is fixedly coupled to the jack shaft.

In certain embodiments, the first elongated tube and the second elongated tube are formed from aluminum.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
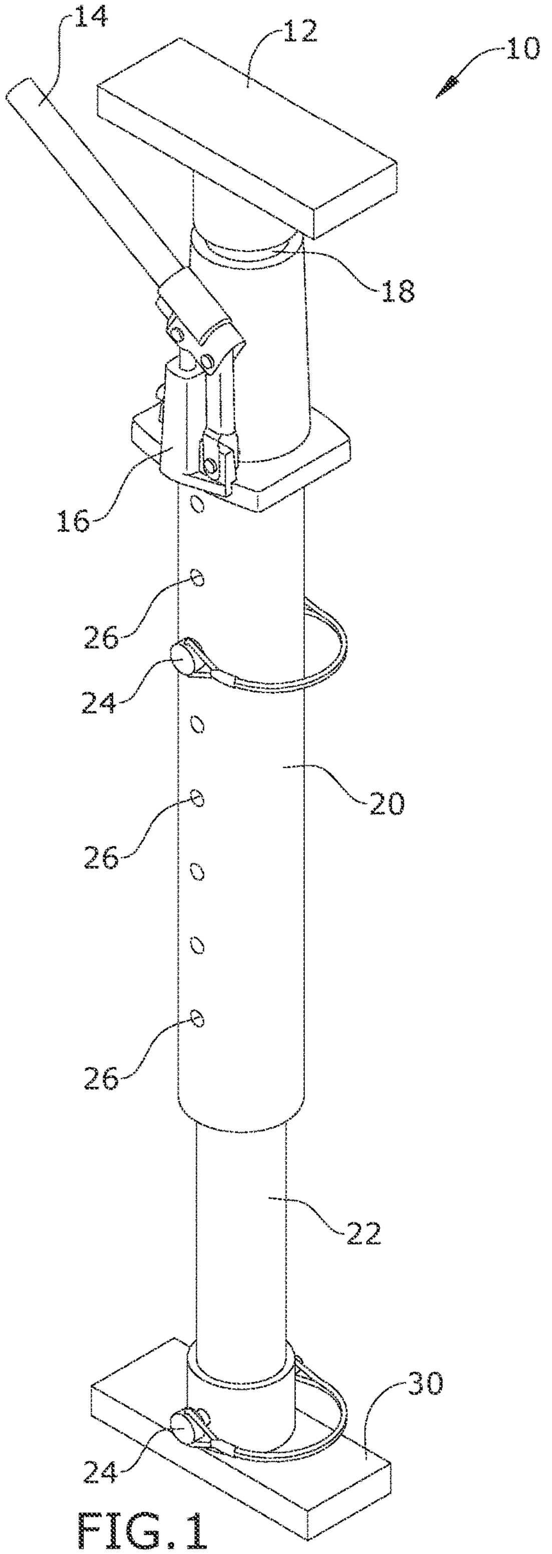
FIG. 1 is a perspective view of an embodiment of the present invention.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, one embodiment of the present invention is an apparatus that can move, lift or spread materials or equipment in almost any space between items. The tubes and tube extensions allow for use from a minimum of approximately 2 feet up to 12 feet or more, depending on the number and length of extension tubes. As stated above, the present invention is intended to address the issue of spreading, lifting or moving materials or equipment that requires a portable, extendable means of adding leverage. The present invention advantageously works in places that shorter jacks or hydraulic cylinders aren't effective due to the size constraints of traditional jacking equipment. This apparatus is also self-contained, lighter weight and less costly than similar or traditional jack equipment.

The present invention is an improvement on what currently exists. This apparatus works in places that shorter jacks or hydraulic cylinders aren't effective due to the size and weight constraints of traditional jacking equipment. This apparatus is also self-contained, lighter weight and less costly than similar or traditional jack equipment. Traditional jacking devices are heavy steel, and often require more than one user to operate. The functional range of other systems is generally 30" or less. This apparatus needs only one operator. This apparatus can be used to move or spread material or equipment over a long-range, by extending the base unit 2 inches at a time, or by adding multiple extension tubes of, for example, 1 foot, 2 foot, 4 foot, or custom length extensions.

Figure 2:
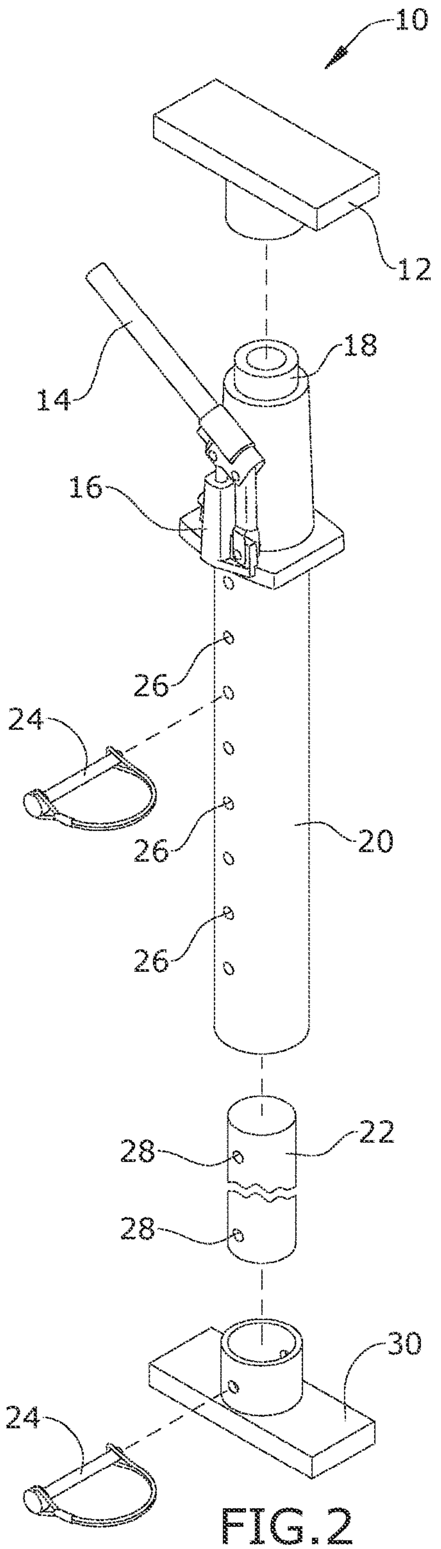
FIG. 2 is an exploded view of the embodiment of the present invention.
Figure 3:
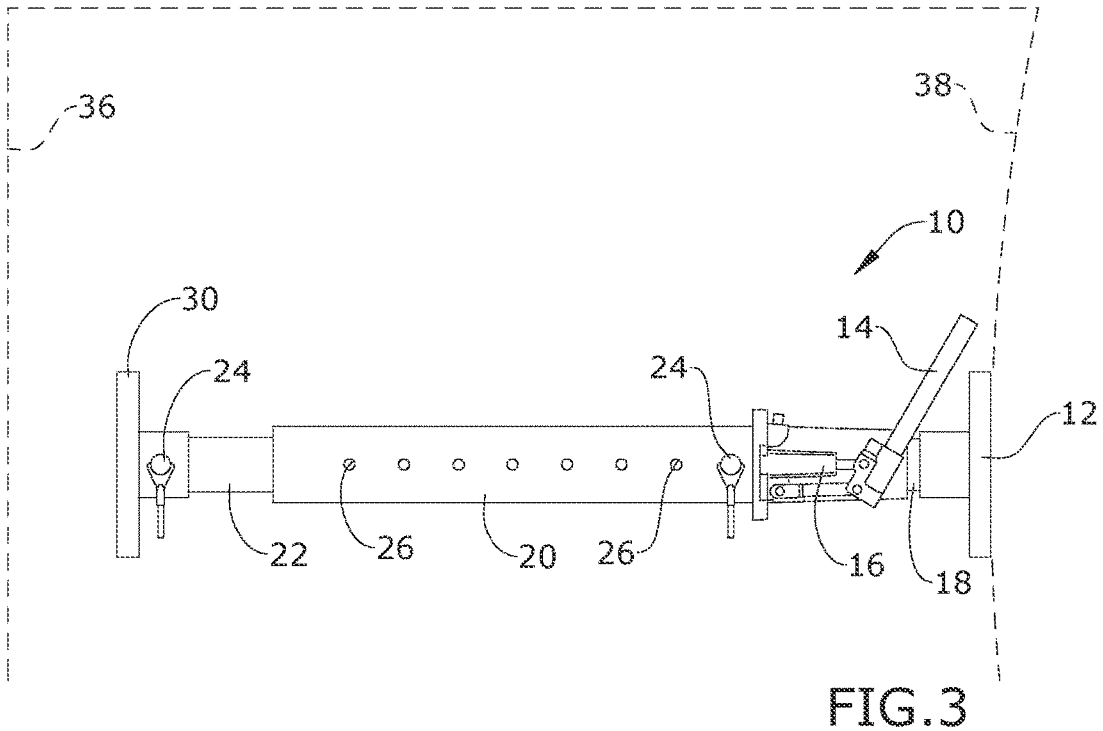
FIG. 3 is a front view of the embodiment of the present invention, shown in retracted position.
Figure 4:
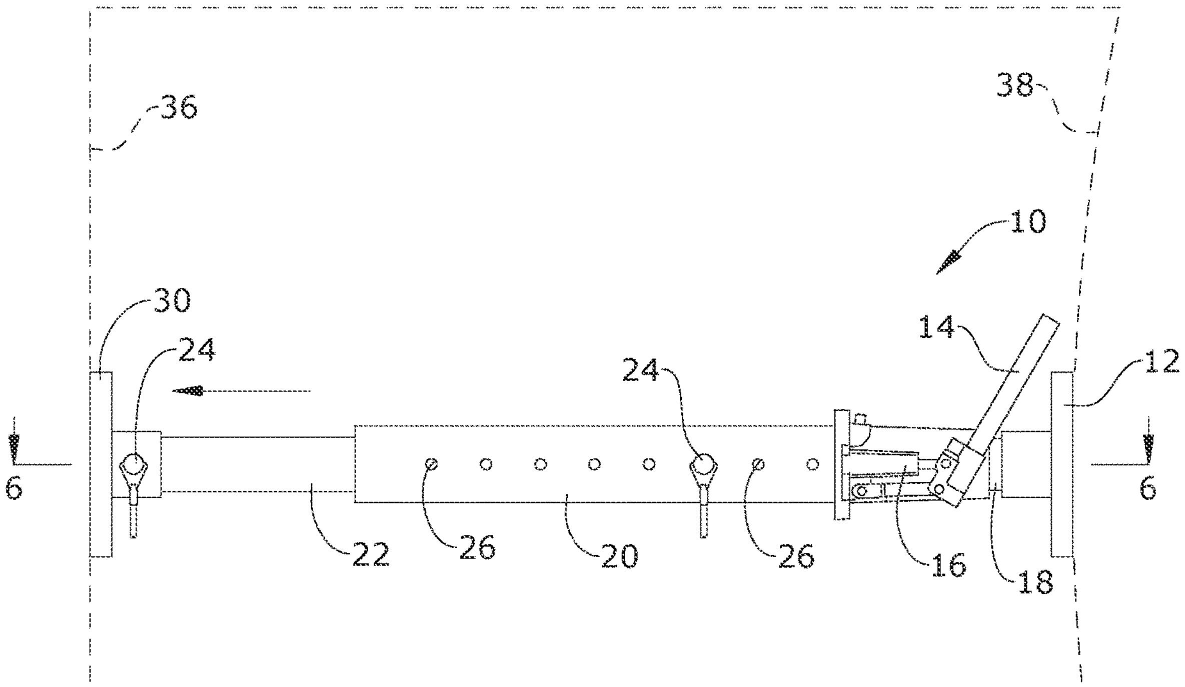
FIG. 4 is a front view of the embodiment of the present invention, shown in the partially extended position.

Referring now to FIGS. 1-6, embodiments of the present invention include a base unit 10. As depicted, the base unit 10 is, for example, 32 inches to 48 inches, when no extensions are added. As shown in FIGS. 3 and 4, the base unit includes a small inner tube 22 that can telescopically slide in or out of a larger outer tube 20. Lynch pins 24 (e.g., a ⅜-inch pin 24) is inserted into the corresponding holes 26, 28 in both tubes. This base unit 10 allows for spreading the tubes 20, 22 in predetermined increments, such as 2-inch increments, via the pins 24. In use, the tubes 20, 22 are spread apart to achieve a desired length and then secured with the lynch pin 24.

At one distal end of the base unit is a top shoe 12, with a bottom shoe 30 being oppositely disposed at a distal end of the small tube 22. Referring to FIG. 2, a lynch pin 24 is used to retain the bottom shoe to the small tube 22. In use, the shoes 12, 30 are placed on or near the objects to be spread apart or moved. For example, as shown in FIG. 4, top shoe 12 is positioned against a first jamb 38 and bottom shoe 30 is positioned against a second jamb 36 by sliding the small tube 22 relative to the large tube 20.

In order to spread the ends of the base unit 10 apart (for whatever purpose the device is being used for), a hydraulic jack 16 is used. The jack 16 is sandwiched between and attached to the large tube 20 and the top shoe 12. A jack handle 14 is rotatably coupled to the hydraulic jack 16. Further, a hydraulic jack shaft 18 is slidably coupled within the hydraulic jack 16. In use, a user lifts and lowers the handle 14 to pump and extend the jack shaft 18 (which pushes the top shoe 12 that is coupled to an end of the jack shaft 18).

Figure 7:
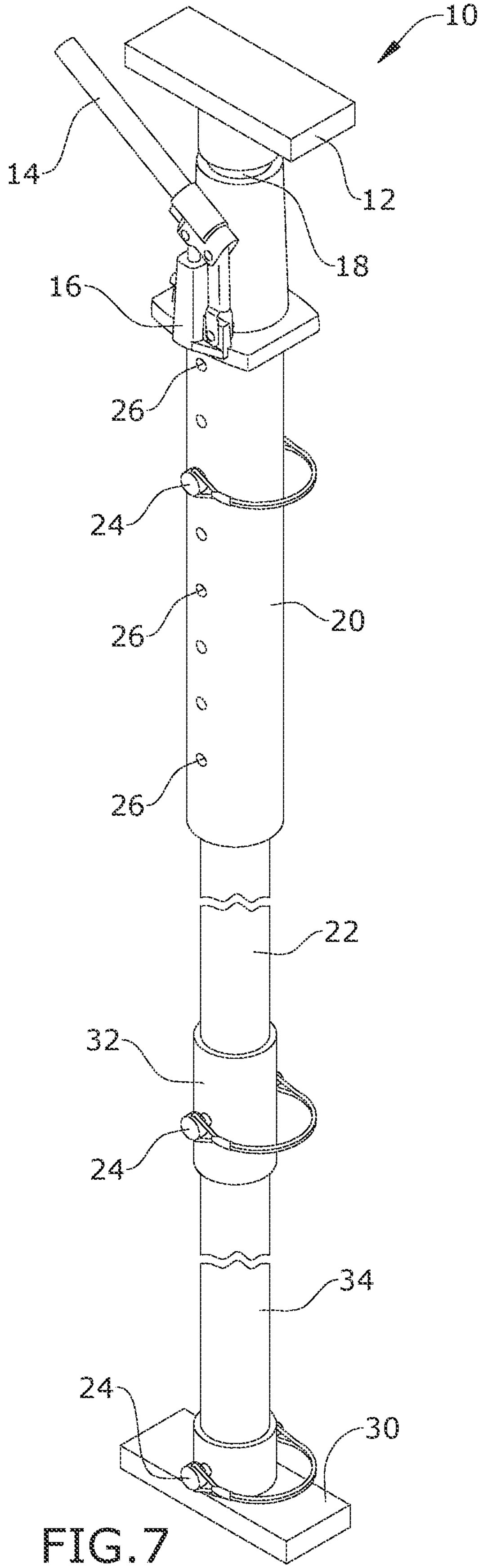
FIG. 7 is an perspective view of the embodiment of the present invention, shown with an extension coupler and tube.

As those with skill in the art will appreciate, certain uses may require a base unit 10 longer than what is provided for, by default. In such a scenario, and as shown in FIG. 7, an extension coupler 32 and extension tube 34 may be used between the small tube 22 and the bottom shoe 30, with the coupler 32 and extension tube 34 connecting to the small tube 22 and bottom shoe 30, respectively, via lynch pins 24.

Figure 8:
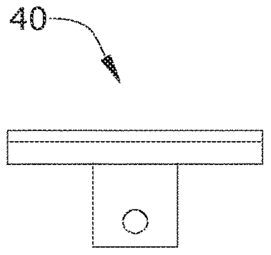
FIG. 8 is a front view of a first shoe of the embodiment of the present invention.
Figure 9:
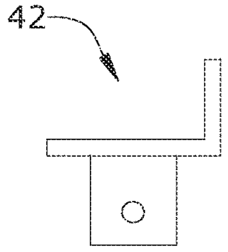
FIG. 9 is a front view of a second shoe of the embodiment of the present invention.
Figure 10:
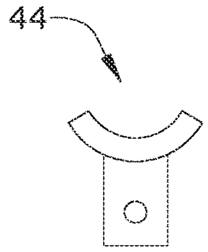
FIG. 10 is a front view of a third shoe of the embodiment of the present invention.
Figure 11:
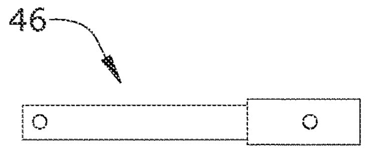
FIG. 11 is a front view of a first extension of the embodiment of the present invention.
Figure 12:
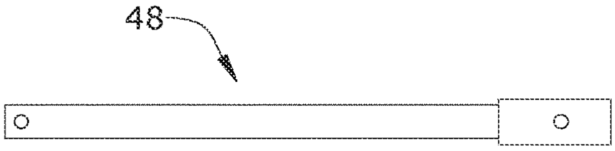
FIG. 12 is a front view of a second extension of the embodiment of the present invention.
Figure 13:
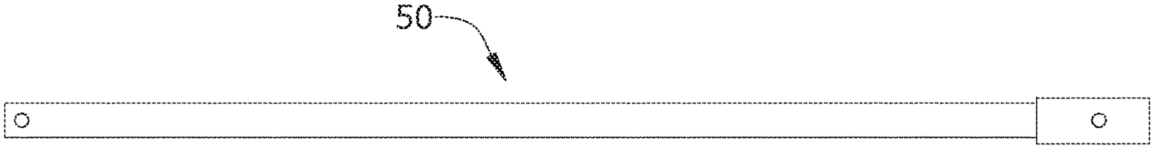
FIG. 13 is a front view of a third extension of the embodiment of the present invention.

As those with skill in the art will appreciate, various modifications to the components may be made in accordance with the present invention. Additionally or alternatively, various components may be provided as accessories to the base unit 10. For example, as shown in FIGS. 8-10, the shoes may be provided as an assortment of variously sized flat face/plate shoes 40 (FIG. 8, which either concentrate or distribute a force applied), another shoe 42 that includes a ninety-degree bend plate (FIG. 9), or another shoe 44 that includes an arcuate plate (FIG. 10). In a similar vein, various length extensions 46, 48, 50 may be provided, as shown in FIGS. 11-13. By way of example, a first extension 46 may be approximately 12 inches long, a second extension 48 may be approximately 24 inches, and a third extension 50 may be approximately 48 inches.

Figure 5:
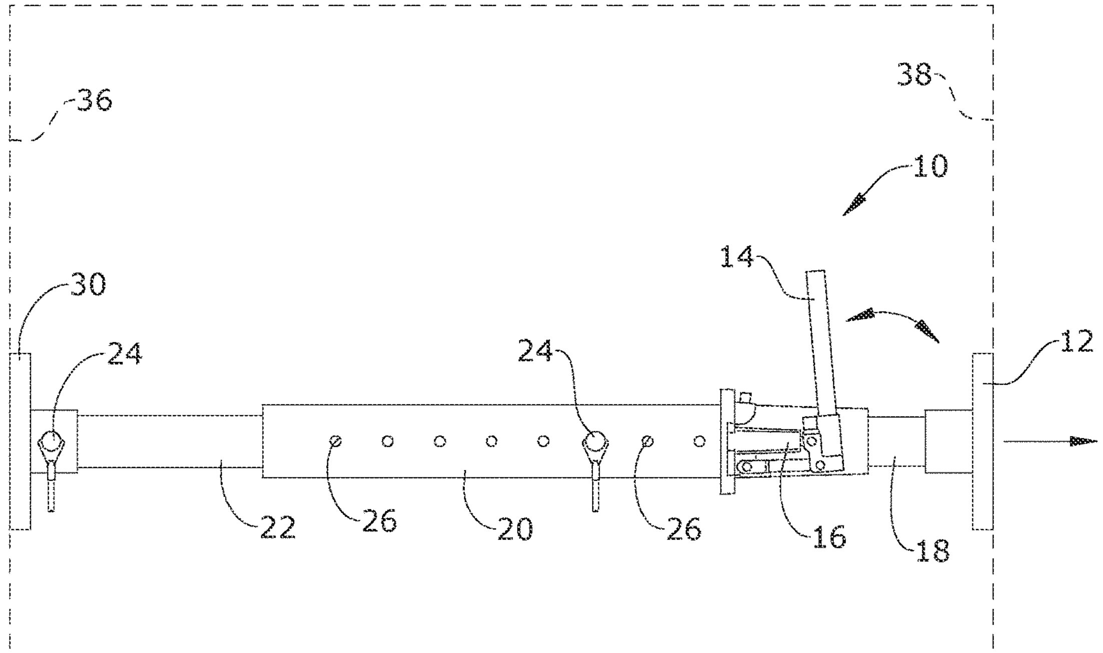
FIG. 5 is a front view of the embodiment of the present invention, shown extended and pressing out the right jamb.
Figure 6:
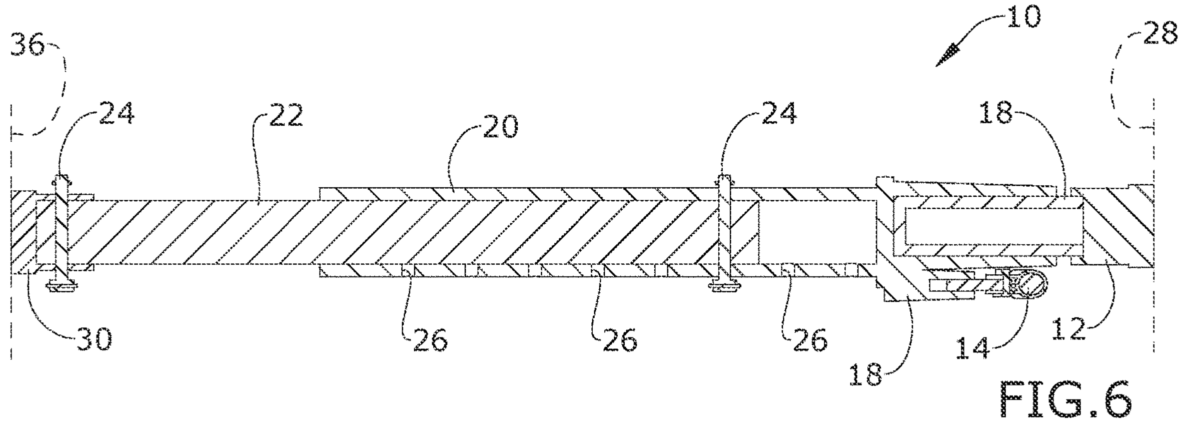
FIG. 6 is a section view taken along 6-6 in FIG. 4.

The base unit 10 and its accessories (as needed) work as an overall assembly that is capable of spreading or jacking various objects (e.g., as depicted from FIGS. 3-5). Once set to the desired length and secured with lynch pins 24, the hydraulic jack handle 14 is operated by pumping to apply pressure at both ends of the base unit 10, thereby lifting, spreading or moving the intended objects (e.g., opposing door jambs 36, 38). Exemplary uses cases are as follows. Commercial Steel door frames can be spread or lifted with this base unit 10 to allow for adjustment and fitment of the doors. Alternatively, the base unit 10 could be used to lift construction beams the final few inches or parts of an inch to allow for alignment of the attachment bolts. This base unit 10 can also be used horizontally on the floor to make the final adjustments necessary for the placement of industrial equipment.

By way of further example, the base unit 10 could be used by rescue personnel to help gain access inside of collapsed buildings or tunnels or to help lift heavy objects off of injured persons and allow for an emergency extraction. It could further be used to gain entry into a jammed elevator door, or could be used in automotive body or frame repair. As is clear, there are many potential applications that would benefit from the present invention.

While methods of making the present would be readily apparent to those with skill in the art from the foregoing and the figures, a further method of making the present invention may include the following. The tubes (which may be formed from aluminum) may be welded to or detachably coupled to (via lynch pins) to adjacent components (e.g., the small tube 22 may detachably coupled to the bottom shoe 30). The top shoe 12 is fastened to the hydraulic ram 18 on the top of the hydraulic jack 16. The inner aluminum tube 22 is inserted into the outer aluminum tube 20 to the closest operational length, and secured with the lynchpin 24. The aluminum plate on top of the tube assembly 20, 22 is welded in place, and hydraulic jack 16 is secured to the flat aluminum plate (see the plate positioned between the tube 20 and the jack 16).

All components of the base unit 10 are important for the base unit to be operational in the 32 inch to 49 inch range. As discussed above, optional 24 inch long aluminum tube can be added to increase the operational range to 61 inches, and two additional 24 inch long optional tubes can be used to increase the operational range to 97 inches, and so on. Depending on the weight or horizontal pressure needed, even more extensions could be employed. The aluminum tubes 20, 22 or aluminum extension tubes 34 can also be cut to allow different operational ranges.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. The term "substantially" shall be interpreted to mean completely and/or nearly completely. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure. Certain elements (i.e., inner tube 22 and extension tube 34) in FIGS. 2 and 7 are shown with breaks in their length for purposes of illustration.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An apparatus for spreading objects, the apparatus comprising:

a first elongated tube and a second elongated tube telescopically and slidably coupled to one another;

a plurality of extensions, each of the plurality of extensions having an extension coupler and an extension tube, the extension coupler having an inner diameter larger than an inner diameter of the extension tube, wherein the extension coupler receives one of a distal end of the second elongated tube, or one of the plurality of extensions into the inner diameter of the extension coupler;

a hydraulic jack coupled to a distal end of the first elongated tube;

a jack shaft coupled to the hydraulic jack;

a first shoe interchangeably coupled directly to a distal end of the jack shaft through a first shoe receiving recess, the first shoe being interchangeable with one of a plurality of accessories, wherein the plurality of accessories are coupled directly to the distal end of the jack shaft; and a second shoe interchangeably couplable in a static condition to a distal end of one of the plurality of extension tubes or the distal end of the second elongated tube, wherein the second shoe is interchangeable with one or more of the first shoe, or the plurality of accessories;

wherein the jack shaft is configured to selectively increase a first spacing that is defined between the first shoe and the second shoe by actuating the jack shaft.

2. The apparatus of claim 1, wherein the jack shaft is configured to selectively increase a second spacing that is defined between the first tube and the first shoe.

3. The apparatus of claim 1, further comprising a pin configured to lock the first elongated tube and the second elongated tube in position relative to one another.

4. The apparatus of claim 3, wherein the first elongated tube defines a plurality of first openings and the second elongated tube defines a plurality of second openings, the plurality of first openings and the plurality of second openings being configured to receive the pin.

5. The apparatus of claim 4, wherein the first spacing is adjustable between approximately 32 inches to 48 inches by slidably adjusting at least one of the plurality of extensions.

6. The apparatus of claim 1, wherein the second shoe is detachably coupled to the distal end of the second elongated tube.

7. The apparatus of claim 1, wherein the first elongated tube and the second elongated tube are formed from aluminum.

8. The apparatus of claim 1, wherein the plurality of accessories are interchangeably couplable to the distal end of the second elongated tube, or one of the plurality of extensions.

9. The apparatus of claim 1, wherein the plurality of accessories include at least one of: a first accessory shoe having a coupler and a faceplate, the faceplate having a right-angle bend thereon; or a second accessory shoe having a coupler and a faceplate, the second accessory shoe faceplate having an arcuate shape.

* * * * *